Jan. 22, 1963  L. PÉRAS  3,074,737
FRONT AXLE SUSPENSION OF VEHICLES
Filed March 15, 1960  2 Sheets-Sheet 2

Inventor
Lucien Péras
By Stevens Davis Miller & Mosher
Attorneys

United States Patent Office 3,074,737
Patented Jan. 22, 1963

3,074,737
FRONT AXLE SUSPENSION OF VEHICLES
Lucien Péras, Billancourt, France, assignor to Regie Nationale des Usines Renault, Billancourt, France
Filed Mar. 15, 1960, Ser. No. 15,121
Claims priority, application France Apr. 13, 1959
6 Claims. (Cl. 280—96.2)

The present invention relates to an improved construction of a rigid front axle of an automobile vehicle which comprises suspension rods disposed before the axle.

This invention is concerned more particularly with a front axle arrangement having a pair of front suspension rods at either end and wherein one of these rods is pivoted at one end substantially close to the longitudinal axis of the chassis and at the other end very close to the wheel center, the other suspension rod of the pair being shorter and substantially parallel to the longitudinal axis of the vehicle.

The essential advantages resulting from this arrangement may be summarized as follows:

It provides a triangular structure whereby lateral efforts can be absorbed without resorting to a transverse reaction bar;

It provides a considerable simplification in that the two oblique suspension rods may be attached to a common central pivot on the chassis.

On the other hand, with this arrangement the driver's seat and the steering mechanism, column and wheel may be disposed in a more advanced position, and the steering gear may be mounted in a forward position with the steering drag link extending in a transverse plane substantially parallel to said suspension rods, this being particularly advantageous in that unpleasant and detrimental reactions on the steering mechanism are avoided during the vertical wheel movements caused by road unevennesses.

This arrangement is also advantageous in that it affords a smaller turning circle and makes it possible to guide the axle very close to the wheel axes by means of the long oblique rods, the short rods being pivoted behind the axle and located in a higher plane with respect to its axis.

The elastic members of the suspension system, for example the helical or coil springs, may also be located above the axle and at the maximum relative spacing, that is, as close as possible to the wheel tires, so that a considerable transverse stability of the vehicle body is obtained.

A typical form of embodiment of a front axle arrangement according to this invention will now be described by way of example with reference to the accompanying drawings forming part of this specification. In the drawings.

Figure 1:
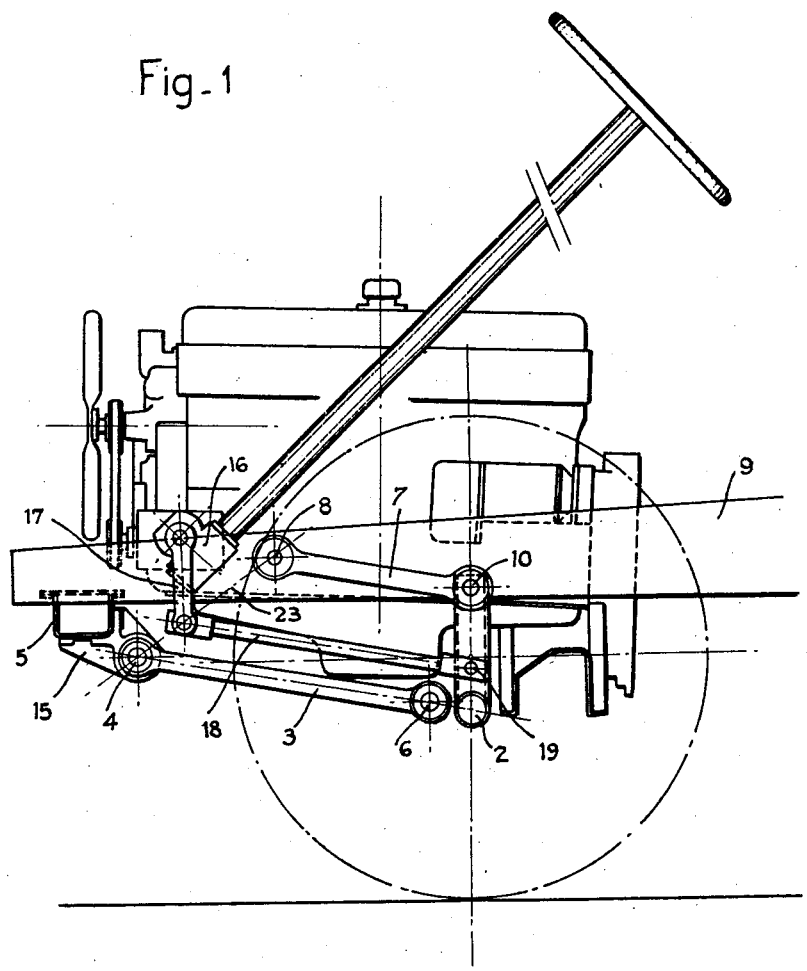
FIGURE 1 is a side elevational view of the axle, wherein the stub-axle support is omitted for the sake of clarity.
Figure 2:
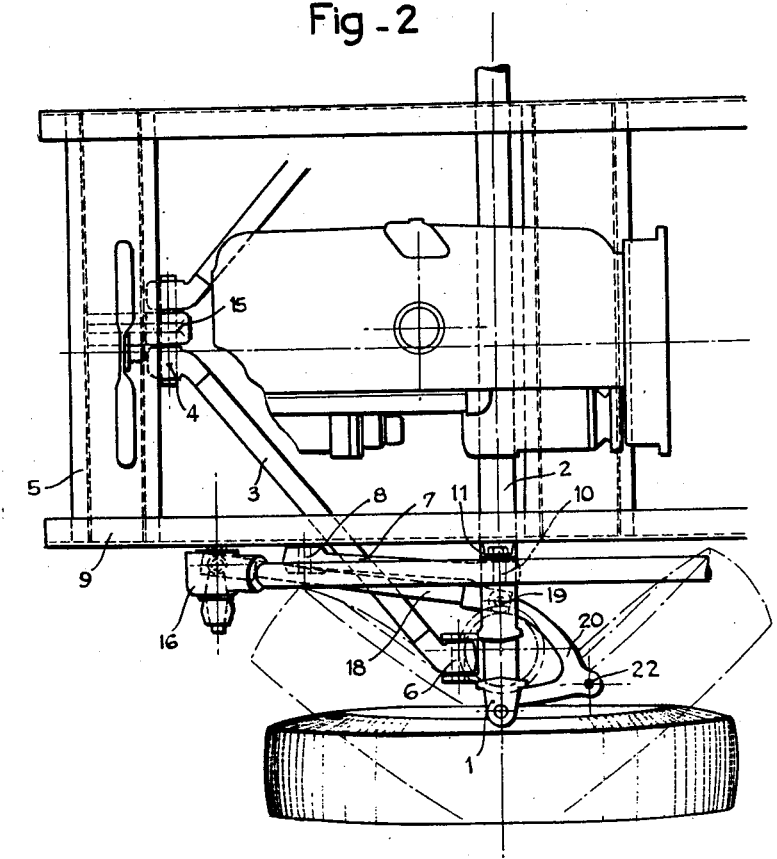
FIGURE 2 is a plane view showing the relative arrangement of the axle and the elements associated therewith, on the steering-gear side.
Figure 3:
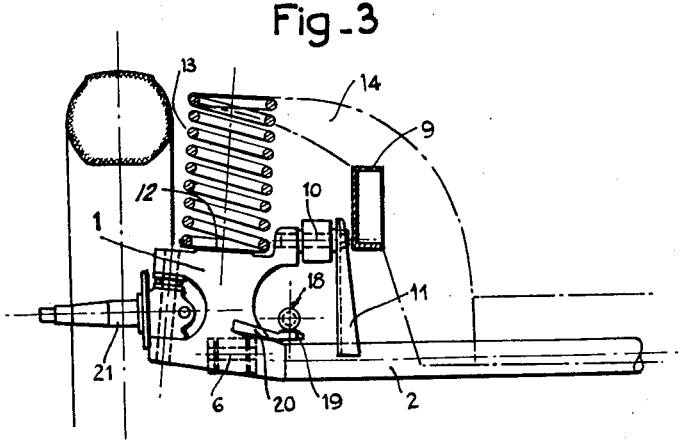
FIGURE 3 is an elevational view taken in the longitudinal direction of the vehicle, showing the axle end construction also on the steering-gear side.

In the drawings, the axle consisting of a pair of yoke-shaped stub-axle supports 1 interconnected by an axle beam 2 has each end connected to the front end of the frame or chassis of the vehicle by means of an oblique rod 3 pivoted at 4 centrally of a cross member 5 of the chassis and on the other hand at 6 to the lower portion of the relevant stub-axle support. Moreover, a shorter link 7 substantially parallel to the plane of symmetry of the vehicle is pivoted at 8 on the outer side of the corresponding longitudinal side member 9 of the chassis and at 10 on the axle above the axis thereof.

This last-mentioned pivotal connection 10 is arranged in this example between an upper arm of the stub-axle carrier and an auxiliary post 11 carried by the axle beam 2.

The stub-axle carrier has secured thereon the support 12 of a corresponding helical or coil suspension spring 13, the chassis bearing on this spring through the medium of a rigid overhanging arm 14 extending from the corresponding longitudinal side member of the chassis.

In this arrangement the function of the short links 7 is not only to guide the axle but also and more particularly to act as longitudinal reaction links, and the oblique rods 3, with their pivots extending transversely to the chassis of the vehicle, act as transverse reaction bars. This triangular structure affords a particularly simple and therefore cheaper axle construction, as evidenced in this example by the use of an axle beam 2 consisting of a tube welded to the end stub-axle carriers 1; on the other hand, with this construction it is possible to provide only one pivot pin common to both oblique rods 3, with a single bracket 15 for mounting this pin on the chassis.

On the other hand, the steering members are disposed in a forward position, the steering gear 16 being mounted at the front end of the chassis, as shown, laterally of one of the longitudinal members of the chassis. The steering is controlled according to the conventional practice by means of a drop arm 17 and a drag link 18 pivotally connected at 19 to the track arm 20 rigid with the relevant stub-axle 21, this arm being provided with a knuckle connection 22 for the track rod (not shown).

The forward position of the drag link 18 as well as its arrangement in a transverse plane parallel to the suspension links 3 and 7 (see FIG. 1) is advantageous in that it damps out or reduces the reactions of the suspension system on the steering system during the operation of the vehicle.

To this end, more particularly, the steering mechanism is preferably so designed that when the vehicle is running along a straight line the pivot pin connecting the drag link 18 to the drop arm 17 has its axis located within the transverse plane 23 coincident with the axes of the front pivots for links 3 and 7, so that during the vertical movements of the wheels in relation to the chassis the geometrical loci described by the axes of pins 6, 10, and 19 will be substantially homologous in order to ensure a good steering stability.

Although the present invention has been described in conjunction with a preferred embodiment, it is to be understood that modifications and variations may be resorted to without departing from the spirit and scope of the invention, as those skilled in the art will readily understand. Such modifications and variations are considered to be within the purview and scope of the invention and appended claims.

I claim:

1. In a vehicle including a frame having side members and a front cross member, a front axle suspension assembly comprising a rigid front axle disposed rearward of said front cross member and having opposing ends adapted to support wheels, a pair of suspension rods disposed at each end of the axle and including a first and second suspension rod, said first rod being separately pivotally connected to the frame cross member at substantially the center thereof and extending rearwardly and obliquely to the axle end and being pivoted thereto very close to the wheel center, the second rod being shorter than the first rod and extending between the side member and the axle end in a direction substantially parallel to the longitudinal axis of the frame, said second rod being pivoted to the axle end and extending forwardly therefrom and being pivoted to the side member, said first and second rods extending in substantially parallel, transverse planes with the first rod being located below the second rod and suspension spring means between the front axle suspension assembly and the frame.

2. The combination of claim 1, including a stub axle for a steerable wheel on the axle end and a steering mechanism for one of the wheels including a steering gear box located forwardly of the axle, a steering gear arm connected to the gear box, a track arm rigid with the stub axle and a drag link pivotally connected between the steering gear arm and the track arm and extending in a transverse plane parallel to the suspension rods.

3. The combination of claim 2, wherein said drag link is connected to the steering gear arm by a pivot pin which lies in a transverse plane coincident with the axes of the front pivot pins of said suspension rods when the vehicle is traveling along a straight line.

4. The combination of claim 1, wherein said suspension spring means includes helicoidal springs that rest on the axle between said second rods and the wheels.

5. In a vehicle including a frame having side members and a front cross member, a front axle suspension assembly comprising a rigid front axle disposed rearwardly of said front cross member and having opposing ends adapted to support wheels, a pair of suspension rods disposed at each end of the axle and including a first and second suspension rod, said first rod being pivotally connected to the frame cross member at substantially the center thereof and extending rearwardly and obliquely to the axle end and being pivoted thereto very close to the wheel center, the second rod being shorter than the first rod and extending between the side member and the axle end in a direction substantially parallel to the longitudinal axis of the frame, said second rod being pivoted to the axle end and extending forwardly therefrom and being pivoted to the side member, said first and second rods extending in substantially parallel, transverse planes with the first rod being located below the second rod, said first rods of each pair having a common but individual pivotal connection with the frame cross member and suspension spring means between the front axle suspension assembly and the frame.

6. In a vehicle including a frame having side members and a front cross member, a front axle suspension assembly comprising a rigid front axle disposed rearwardly of said front cross member and having opposing ends adapted to support wheels, a pair of suspension rods disposed at each end of the axle and including a first and second suspension rod, said first rod being separately pivotally connected to the frame cross member at substantially the center thereof and extending rearwardly and obliquely to the axle end and being pivoted thereto very close to the wheel center, the second rod being shorter than the first rod and extending between the side member and the axle end in a direction substantially parallel to the longitudinal axis of the frame, said second rod being pivoted to the axle end and extending forwardly therefrom and being pivoted to the side member, said first and second rods extending in substantially parallel, transverse planes with the first rod being located below the second rod, said second rod having its pivot connection with the side member located rearwardly of the pivot connection of the first rod with the frame cross member and suspension spring means between the front axle suspension assembly and the frame.

References Cited in the file of this patent

UNITED STATES PATENTS

| | | |
|---|---|---|
| 2,054,288 | Hastie | Sept. 15, 1936 |
| 2,073,032 | Stimson | Mar. 9, 1937 |
| 2,164,470 | Opolo | July 4, 1939 |
| 2,746,766 | Nallinger | May 22, 1956 |
| 2,801,865 | Katzung | Aug. 6, 1957 |
| 2,888,271 | Butterfield | May 26, 1959 |